United States Patent
Horino et al.

(10) Patent No.: US 10,415,114 B2
(45) Date of Patent: Sep. 17, 2019

(54) WIRE HEATING SYSTEM AND WIRE HEATING METHOD

(71) Applicant: NETUREN CO., LTD., Shinagawa-ku, Tokyo (JP)

(72) Inventors: Takashi Horino, Tokyo (JP); Fumiaki Ikuta, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 539 days.

(21) Appl. No.: 14/771,286

(22) PCT Filed: Mar. 14, 2014

(86) PCT No.: PCT/JP2014/057935
§ 371 (c)(1),
(2) Date: Aug. 28, 2015

(87) PCT Pub. No.: WO2014/142355
PCT Pub. Date: Sep. 18, 2014

(65) Prior Publication Data
US 2016/0010175 A1    Jan. 14, 2016

(30) Foreign Application Priority Data
Mar. 14, 2013 (JP) .................. 2013-051926

(51) Int. Cl.
*H05B 6/10* (2006.01)
*C22C 38/00* (2006.01)
(Continued)

(52) U.S. Cl.
CPC .................. *C21D 9/54* (2013.01); *C21D 1/42* (2013.01); *C21D 8/06* (2013.01); *C21D 8/065* (2013.01);
(Continued)

(58) Field of Classification Search
CPC ............ C21D 8/06; C21D 8/065; C21D 9/52; C21D 9/525; C21D 9/60; C21D 11/00;
(Continued)

(56) References Cited

U.S. PATENT DOCUMENTS 3,697,335 A    10/1972 Kyriakis et al.
4,788,394 A    11/1988 Vanneste et al.
(Continued)

FOREIGN PATENT DOCUMENTS

FR    2418601    9/1979
GB    605776    7/1948
(Continued)

OTHER PUBLICATIONS

International Search Report for PCT/JP2014/057935, dated Jul. 4, 2014.

*Primary Examiner* — Quang T Van
(74) *Attorney, Agent, or Firm* — Wenderoth, Lind & Ponack, L.L.P.

(57) ABSTRACT

A wire heating system includes an induction heating apparatus having a power supply and an induction coil arranged to heat a wire rod by an induction heating using current supplied from the power supply, and a controller configured to control the current to be supplied to the induction coil based on a feeding speed of the wire rod. The induction heating apparatus has a heating section in which the wire rod is heated by the induction heating using the induction coil, and a soaking section located downstream of the heating section to homogenize the temperature distribution of the induction-heated wire rod. The controller is configured to control the current to be supplied to the induction coil such that a temperature of the wire rod at a downstream end of the soaking section becomes a target temperature.

10 Claims, 10 Drawing Sheets

(51) Int. Cl.
*C21D 9/60* (2006.01)
*C21D 9/54* (2006.01)
*C21D 8/06* (2006.01)
*C21D 9/52* (2006.01)
*C21D 11/00* (2006.01)
*C21D 1/42* (2006.01)
*H05B 6/06* (2006.01)
*H05B 1/02* (2006.01)

(52) U.S. Cl.
CPC .............. *C21D 9/52* (2013.01); *C21D 9/525* (2013.01); *C21D 9/60* (2013.01); *C21D 11/00* (2013.01); *H05B 1/023* (2013.01); *H05B 6/06* (2013.01); *H05B 6/10* (2013.01); *H05B 6/104* (2013.01); *H05B 6/108* (2013.01); *Y02P 10/253* (2015.11)

(58) Field of Classification Search
CPC ... C21D 1/42; C21D 9/54; H05B 6/06; H05B 6/104; H05B 1/023; H05B 6/08; H05B 6/10; Y02P 10/253

USPC ........ 219/636, 601; 148/568, 320, 511, 576, 148/545, 510; 174/72 A, 113 R, 128.1; 266/90, 129, 78, 87
See application file for complete search history.

(56) References Cited

U.S. PATENT DOCUMENTS 7,011,720 B2 * 3/2006 Hukuhara ................ C21D 9/60
                148/320
2012/0217060 A1 * 8/2012 Kusakari ................ C22C 21/02
                174/72 A

FOREIGN PATENT DOCUMENTS

| | | |
|---|---|---|
| JP | 3-15188 | 1/1991 |
| JP | 06-079389 | 3/1994 |
| JP | 2001-023763 | 1/2001 |
| JP | 2002-256347 | 9/2002 |
| JP | 2002-285231 | 10/2002 |

\* cited by examiner

WIRE HEATING SYSTEM AND WIRE HEATING METHOD

TECHNICAL FIELD

The present invention relates to a system and a method for heating wire rods.

BACKGROUND ART

Related art heat treatment systems are configured to heat wire rods by applying electric current through wire rods. For example, there is a conventional heat treatment system configured to perform the steps of drawing a wire rod wound in a coiled manner, heating the drawn wire rod to a specified temperature using a direct resistance heating apparatus, cooling the heated wire rod using a cooling apparatus, and rewinding the cooled wire rod in a coiled manner (see, e.g., JP2002-256347A).

The direct resistance heating apparatus is provided to perform quenching and annealing on the wire rod. The direct resistance heating apparatus includes a power supply and two sets of current-applying rolls configured to apply electric current to the drawn wire rod with each set holding the wire rod in a rolling manner. The wire rod passing between the two sets of current-applying rolls is controlled to have a target temperature suitable for heating.

Immediately after the start of heat treatment of the wire rod, or immediately before the end of the heat treatment, the heated temperature of a portion the wire rod passing between the two sets of current-applying rolls does not reach the target temperature, so the portion of the wire rod that has passed between the current-applying rolls immediately before or after reaching the target temperature becomes off-grade.

Therefore, in the conventional example, the system is designed to detect a moving speed of the wire rod in a drawing section using a sensor, and to detect current flowing in a portion of the wire rod passing between the two sets of current-applying rolls using a current sensor, so as to control the power supply such that the passing portion of the wire rod reaches the target temperature, based on signals from the speed sensor and the current sensor.

The wire rod that is heat-treated by this conventional system is relatively thin (about 2 mm), and is wound in a coiled manner after the heat-treatment.

With regard to a relatively thick wire rod of about 7 mm to about 19 mm, there are demands for processing (e.g., pressing) the wire rod in-line after the heat treatment. However, the conventional system cannot handle such processing after the heat treatment, as the wire rod is wound in a coiled manner directly after the heat treatment.

SUMMARY OF INVENTION

To address the demands described above, a processing machine such as a pressing machine may be arranged downstream of the direct resistance heating apparatus, instead of a winding roll for winding the heat-treated wire rod. In the processing machine, for example, the wire rod is cut in a specified length by a cutting machine before the processing. Therefore, it is required to repeat feeding and feeding-interruption of the wire rod to the processing machine in accordance with an operation and standby of the processing machine.

If the direct resistance heating apparatus is continuously operated during the interruption of the feeding of the wire rod to the processing machine, the wire rod becomes overheated. In view of this, the operation of the direct resistance heating apparatus may be interrupted when the feeding of the wire rod is interrupted. However, this may result in insufficient heating of the wire rod.

In the conventional system, a feeding speed of a wire rod is controlled. However, this speed control is performed immediately after the heat treatment or immediately before the end of the heat treatment in order to improve a production yield, and cannot deal with a rapid change in wire speed. Therefore, the conventional system cannot be directly applied to a configuration in which the wire rod in processed (e.g., pressed) after the heat-treatment.

Accordingly, an object of the present invention is to provide a wire heating system and a wire heating method capable of heating the wire rod to a given temperature and constantly performing soaking for subsequent processing of the heated wire rod.

According to an aspect of the present invention, a wire heating system includes an induction heating apparatus having a power supply and an induction coil arranged to heat a wire rod by an induction heating using current supplied from the power supply, and a controller configured to control the current to be supplied to the induction coil based on a feeding speed of the wire rod. The induction heating apparatus has a heating section in which the wire rod is heated by the induction heating using the induction coil, and a soaking section located downstream of the heating section to homogenize the temperature distribution of the wire rod induction-heated by the induction coil such that the temperature of the wire rod at a downstream end of the soaking section becomes a target temperature. The controller is configured to control the current to be supplied to the induction coil such that the temperature of the wire rod at the downstream end of the soaking section becomes the target temperature.

According to another aspect of the present invention, a wire heating method includes heating a wire rod fed into an induction coil in a heating section by an induction heating, homogenizing the temperature distribution of the wire rod in a soaking section located downstream of the heating section, and controlling current to be supplied to the induction coil based on a feeding speed of the wire rod fed into the induction coil such that the temperature of the wire rod at a downstream end of the soaking section becomes a target temperature.

With the configuration described above, the wire rod is fed to the induction heating apparatus, in which the induction coil is applied with electric current from the power supply, causing electromagnetic induction so that an eddy current in a direction opposite to the current flowing through the coil is generated on the surface of the wire rod, thereby heating the wire rod due to Joule heating.

When the feeding of the wire rod is interrupted, a feeding speed of the wire rod decreases from the set speed, so that the temperature of the wire rod in the soaking section deviates from the target temperature if the current in unchanged. According to the configuration described above, however, the controller controls the current to be supplied to the induction coil from the power supply such that the temperature of the wire rod at the downstream end of the soaking section becomes the target temperature. A heat value of the induction coil is proportional to the current supplied to the induction coil. Thus, the controller controls the current to be supplied to the induction coil, thereby controlling the heat value of the wire rod.

When the feeding of the wire rod resumes, the feeding speed of the wire rod increases to the set speed and the temperature of the wire rod in the soaking section deviates from the target temperature if the current is unchanged. However, as set forth in the foregoing, the current to be supplied to the induction coil from the power supply is controlled by the controller such that the temperature of the wire rod becomes the target temperature.

Thus, even when feeding and feeding-interruption of the wire rod are repeated, a controlled current is supplied to the induction coil by the controller so that the temperature at the downstream end of the soaking section becomes the target temperature. Accordingly, even when the feeding speed of the wire rod changes, the wire rod is not overheated or insufficiently heated, so that the temperature distribution of the wire rod is constantly homogenized.

In other words, according to the above current control of the induction coil, constant amount of electric energy is input to the wire rod, irrespective of a feeding speed of the wire rod.

The controller may control the current to be supplied to the induction coil so as to satisfy $I=xv^{0.5}$ where I is the current to be supplied to the induction coil, v is a feeding speed of the wire rod, and k is a proportional constant.

In this configuration, since the current to be supplied to the induction coil can be accurately obtained from the feeding speed of the wire rod using the calculation formula, the temperature distribution of the wire rod can be easily homogenized irrespective of the feeding speed of the wire rod.

The controller may control the current to be supplied to the induction coil so as to satisfy $I=k \times v^{0.5}+\Delta I$, wherein I is the current to be supplied to the induction coil, v is the feeding speed of the wire rod, k is a proportional constant, and $\Delta I$ is a standby current.

When dealing with an abrupt deceleration or acceleration of the feeding speed, there is an issue of time lag by electromagnetic oscillation from a heating start command to an actual start of the heating. However, according to this configuration, a standby current ($\Delta I$) compensates for a delay of current I due to oscillations, so that a delay in starting the heating of the wire rod is eliminated, thereby sufficiently heating the wire rod.

The target temperature may be in a range of 300° C. to 500° C. This enables a heating that is suitable for warm working.

The wire heating system may further include a processing machine arranged to process the wire rod induction-heated by the induction heating apparatus, a wire feeding apparatus arranged to intermittently feed the wire rod to the induction heating apparatus, and a speed detecting apparatus arranged to detect the feeding speed of the wire rod fed by the wire feeding apparatus and to send a signal indicative of the detected feeding speed of the wire rod to the controller.

According to this configuration, the wire rod is fed from the wire feeding apparatus to the induction heating apparatus. In the induction heating apparatus, the wire rod heated in the heating section reaches the downstream end of the soaking section to have the target temperature, and then is fed to the processing machine. To process the wire rod in the processing machine, the feeding of the wire rod by the wire feeding apparatus is interrupted. At this time, the feeding speed of the wire rod is reduced to zero from the set speed so that the temperature of the wire rod may deviate from the target temperature. However, the feeding speed of the wire rod is detected by the speed detecting apparatus and the corresponding signal is sent to the controller, and the controller controls the current to be supplied to the induction coil from the power supply, such that the temperature of the wire rod at the downstream end of the soaking section becomes the target temperature.

When the feeding of the wire rod resumes, the feeding speed of the wire rod is increased to the set speed from zero so that the temperature of the wire rod in the soaking section may deviate from the target temperature. However, as set forth in the foregoing, the current to be supplied to the induction coil from the power supply is controlled by the speed detecting apparatus and the controller, such that the temperature of the wire rod becomes to the target temperature.

Therefore, even when the feeding and feeding-interruption of the wire rod are repeated by the wire feeding apparatus as the wire rod is processed by the processing machine, a controlled current is supplied to the induction coil using the speed detecting apparatus and the controller, such that the temperature of the downstream end of the soaking section reaches the target temperature. Accordingly, even in the case where the feeding of the wire rod is interrupted, the wire rod is not overheated or insufficiently heated, so that the induction-heated portion of the wire rod can be used in a subsequent processing, thereby improving a production yield.

DESCRIPTION OF EMBODIMENTS

An exemplary embodiment of the present invention will now be described with reference to the drawings.

Figure 1:
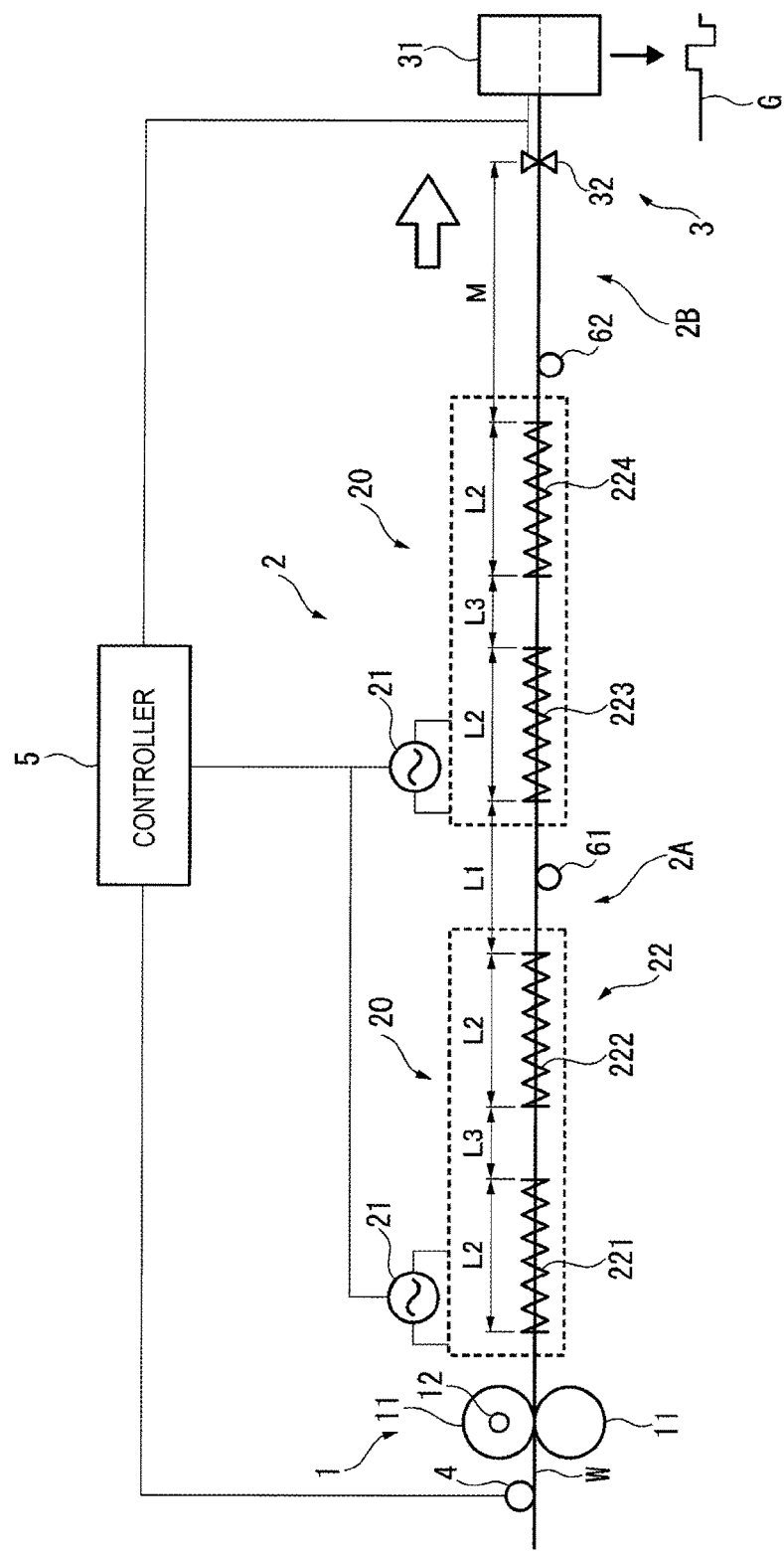
FIG. 1 is a schematic view of a wire heating system according to an embodiment of the present invention.

FIG. 1 illustrates an overall configuration of the embodiment. As shown in FIG. 1, a wire heating system includes a wire feeding apparatus 1 arranged to feed a wire rod W drawn from a wire winding roller (not shown) in a given direction, an induction heating apparatus 2 arranged to heat the wire rod W fed from the wire feeding apparatus 1 by a high-frequency induction heating, a processing machine 3 arranged to process the wire rod W heated by the induction heating apparatus 2, a speed detecting apparatus 4 arranged to detect a feeding speed of the wire rod fed by the wire feeding apparatus 1, and a controller 5 configured to control the induction heating apparatus 2 based on the feeding speed of the wire rod detected by the speed detecting apparatus 4. According to the present embodiment, the induction heating apparatus 2 and the controller 5 form a heating apparatus. The wire rod W is a steel wire rod having a diameter of about 7 mm to about 19 mm.

The wire feeding apparatus 1 has feeding rollers 11 arranged in a pair interposing the wire rod W, and a drive part 12 configured to drive the feeding rollers 11. The drive part 12 intermittently switches between a constant speed mode in which the wire rod is fed to the induction heating apparatus 2, and an interruption mode in which the feeding of the wire rod is interrupted. The constant speed mode is a state in which the wire rod W is fed to the induction heating apparatus 2 at a constant speed and in which the wire rod W is not processed by the processing machine 3. The interruption mode includes a zero-speed mode in which the feeding speed is zero, a deceleration mode in which the feeding speed is decelerated from the constant speed mode to the zero-speed mode, and an acceleration mode in which the feeding speed is accelerated from the zero-speed mode to the constant speed mode. The drive part 12 may be driven by receiving a command from the controller 5 or from a separate control unit other than the controller 5.

The induction heating apparatus includes a power supply 21 and an induction coil 22 arranged to heat the wire rod W by a high-frequency induction heating using electric current supplied from the power supply 21. In this embodiment, a plurality of (e.g., two) power supplys 21 are provided, and each power supply 21 may be arranged in combination with a plurality of induction coils 22, e.g., two coils. Total of four induction coils 22, i.e. a first coil 221, a second coil 222, a third coil 223 and a fourth coil 224, are arranged in line along the feeding direction of the wire rod W.

The power supply 21 and the first and second coils 221, 222 form one heating unit 20, and the power supply 21, and the third and fourth coils 223, 224 form another heating unit 20. The power supplys 21 of the heating units 20 are respectively controlled by signals from the controller 5. According to another embodiment, one power supply may be provided for each coil.

A distance between the second and third coils 222, 223 of the adjacent heating units 20 is L1. A length of each of the first coil 221, the second coil 222, the third coil 223 and the fourth coil 224 is L2. A distance between the first and second coils 221, 222 and a distance between the third and fourth coils 223, 224 are L3. In the present embodiment, in the feeding direction of the wire rod W, a section with a length (L1+4×L2+2×L3) between the upstream end of the most upstream induction coil 22 and the downstream end of the most downstream induction coil 22 forms a heating section 2A. The length of the heating section 2A is determined based on the processing capability of the entire system, a diameter of the wire rod, and other conditions, and is, for example, 2400 mm.

At the downstream of the heating section 2A, a soaking section 2B with a length M is provided. The soaking section 2B is a section in which the temperature distribution of the wire rod W induction-heated by the induction coil 22 is homogenized by natural heat radiation, thereby achieving a target temperature of 300° C. to 500° C. at the processing machine. The length M of the soaking section 2B is determined based on the processing capability of the entire system and other conditions as in the case of the heating section 2A, and is, for example, 1000 mm.

The processing machine 3 is provided to process the heated wire rod W, and includes a working machine 31 and a cutting machine 32 disposed upstream of the working machine 31. The working machine 31 is, for example, a press machine or other processing machine, has upper and lower molds that are openable and closable, so as to bend the wire rod W into a specified shape, e.g. a right-angled or acute-angled bend, or a spiral, thereby forming a product G. The cutting machine 32 is disposed at a downstream end of the soaking section 2B. Here, the downstream end of the soaking section 2B is a position where the target temperature is set and where the wire rod W is cut by the cutting machine 32. The cutting machine 32 has upper and lower edge tools.

The wire-speed detecting apparatus 4 is disposed at an optional position, e.g. upstream of the wire feeding apparatus 1 as shown in FIG. 1, and is configured to detect the feeding speed of the wire rod W. For example, the speed detecting apparatus may use a rotation of a rotor (not shown) brought into contact with the wire rod W, a laser beam irradiated on and then reflected from the wire rod W, or a rotary encoder (not shown) provided on a rotary shaft of the feeding roller 11.

The controller 5 is configured to control the current to be supplied to the induction coil 22 based on the feeding speed of the wire rod detected by the speed detecting apparatus 4, such that the temperature of the wire rod W at the downstream end of the soaking section 2B becomes the target temperature.

Specifically, the controller 5 controls the current to satisfy $I=I o \times(v / v o)^{0.5}+\Delta I$, where I is the current to be supplied to the induction coil 22 at present, v is current feeding speed of the wire rod W, To is the current to be supplied to the induction coil 22 in the constant speed mode, vo is a feeding speed of the wire rod in the constant speed mode, and $\Delta I$ is a standby current. Here, by introducing a proportional constant $k=Io/(vo^{0.5})'$, the calculation formula is expressed as $I=k \times(v^{0.5})+\Delta I$.

In this embodiment, the controller 5 controls the power supply 21 to supply the current to the induction coil 22 so as to satisfy the calculation formula, so that, even when the feeding speed v of the wire rod W is changing, the temperature at the downstream end of the soaking section 2B can maintain the target temperature of 300° C. to 500° C.

Figure 2:
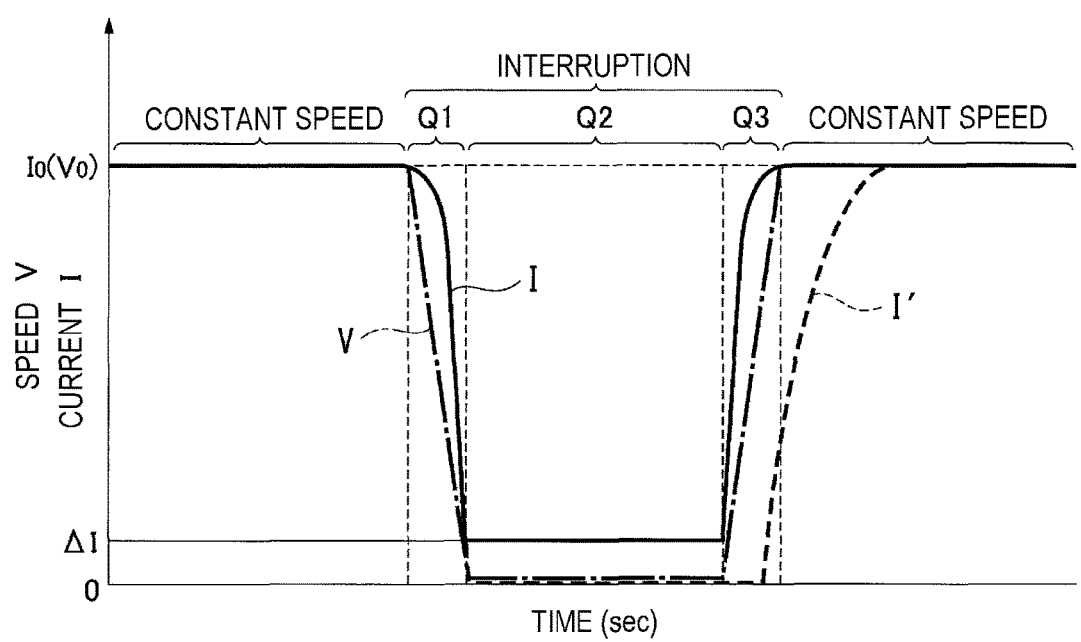
FIG. 2 is a graph showing a relationship of a wire feeding speed v and current I supplied to an induction coil with respect to time.

FIG. 2 shows a relationship between time and the feeding speed v of the wire rod W and the current I supplied to the induction coil 22. In FIG. 2, in the constant speed mode, the feeding speed of the wire rod W is denoted by vo, and the current I supplied to the induction coil 22 is denoted by Io. In the deceleration mode Q1 in which the feeding speed decelerates from the constant speed mode to zero-speed, the feeding speed v decreases at the same rate, but the current I decreases, to the standby current $\Delta I$, along a curve pattern obtained from the calculation formula. In the zero-speed mode Q2 in which the feeding speed is zero, the current I is maintained at the standby current ΔI. In the acceleration mode Q3 in which the feeding speed v accelerates from 0 to vo, the feeding speed v accelerates at the same rate (uniform acceleration), but the current I increases to the current Io along a curve pattern obtained from the calculation formula described above.

The wire rod W is supported by support rollers 61, 62 disposed at appropriate locations, respectively. In the present embodiment, the support rollers 61, 62 are disposed at two locations, i.e. on the outlet sides of the second and fourth coils 222, 224.

In the wire heating system having the configuration described above, the wire rod W drawn from the wire winding roller is fed to the induction heating apparatus 2 by the wire feeding apparatus 1. In the wire feeding apparatus 1, the wire rod W is fed to the induction heating apparatus 2 while repeating the constant speed mode and the interruption mode.

The feeding speed v of the wire rod W is detected by the speed detecting apparatus 4, and a detection signal is sent to the controller 5.

In the constant speed mode, the wire rod W is fed to the induction heating apparatus 2 at a speed of vo. The current I supplied from the power supply 21 to the induction coil 22 by the controller 5 is denoted by Io. In the induction heating apparatus 2, the wire rod W is fed to the first coil 221, the second coil 222, the third coil 223 and the fourth coil 224, which are arranged in the heating section 2A, is heated to a specified temperature, and then is fed to the soaking section 2B. The temperature of the wire rod W is homogenized so as to become a target temperature at the downstream end of the soaking section 2B. The wire rod W that has undergone temperature homogenization in the soaking section 2B is fed to the processing machine 3.

When the mode of feeding the wire rod W to the induction heating apparatus 2 by the wire feeding apparatus 1 is switched from the constant speed mode to the interruption mode, the wire rod W first decreases in feeding speed from vo to 0 in the deceleration mode, the feeding speed maintains zero-speed for a given period of time in the zero-speed mode, and then the feeding speed v accelerates from 0 to vo in the acceleration mode. In the interruption mode having the deceleration mode, the zero-speed mode, and the acceleration mode, the feeding speed v of the wire rod W largely varies. In addition, a change in feeding speed v is detected by the speed detecting apparatus 4, and the detection signal is sent to the controller 5. The controller 5 controls the power supply 21 to supply the current to the first coil 221, the second coil 222, the third coil 223 and the fourth coil 224 based on the detected feeding speed v of the wire rod W, in accordance with the foregoing calculation formula.

Accordingly, the wire rod W is heated in response to the feeding speed v of the wire rod W, so the downstream end of the soaking section 2B is maintained at the target temperature.

Further, in the zero-speed mode in which the feeding speed v of the wire rod W obtained by the wire feeding apparatus 1 is zero, the controller 5 sends a signal to the processing machine 3, the wire rod W is cut by the cutting machine 32 disposed at the downstream end of the soaking section 2B, and then the cut wire rod W is processed with a specified machining operation by the working machine 31 so as to form a product G.

Then, the mode of feeding the wire rod W to the induction heating apparatus 2 by the wire feeding apparatus 1 is switched from the interruption mode to the constant speed mode, and the same processing as described above is performed. In the interruption mode, the current I supplied from the power supply 21 to the induction coil 22 varies from the standby current ΔI.

Accordingly, the present embodiment has the following advantageous effects.

(1) The embodiment includes the induction heating apparatus 2 arranged to heat the wire rod W by an induction heating using the induction coil 22 applied with current supplied from the power supply 21, the processing machine 3 arranged to process the induction-heated wire rod W, the wire feeding apparatus 1 configured to intermittently feed the wire rod W to the induction heating apparatus 2, the wire-speed detecting apparatus 4 configured to detect the feeding speed v of the wire rod, and the controller 5 configured to control the current to be supplied to the induction coil 22 based on the feeding speed v of the wire rod W detected by the speed detecting apparatus 4. The induction heating apparatus 2 has the heating section 2A in which the wire rod W intermittently fed by the wire feeding apparatus 1 is heated using the induction coil 22, and the soaking section 2B disposed downstream of the heating section 2A so as to homogenize the temperature distribution of the wire rod W induction-heated by the induction coil 22 so that the downstream end thereof becomes the target temperature of 300° C. to 500° C. The controller is configured to control the current I to be supplied to the induction coil 22, such that the wire rod W at the soaking section 2B has the target temperature. With this configuration, the wire rod W is intermittently fed in accordance with the processing operation of the processing machine with respect to the wire rod W, so that, even when the constant speed mode and the interruption mode are repeated as the wire rod W is intermittently fed by the wire feeding apparatus 1, the current is supplied to the induction coil 22 such that the downstream end of the soaking section 2B has a target temperature suitable for warm working. Thus, when the feeding mode of the wire rod W is switched from the constant speed mode to the deceleration mode, the zero-speed mode, and the acceleration mode, the current supplied to the induction coil 22 is properly controlled by the controller 5, so that the wire rod W is heated by the induction coil without overheating or insufficient heating, thereby improving a production yield.

(2) The controller 5 controls the current to be supplied to the induction coil 22 so as to satisfy the calculation formula expressed by $I=k \times v^{0.5}$, where I is the current to be supplied to the induction coil 22, v is a feeding speed of the wire rod W, and k is a proportional constant. Therefore, the current I to be supplied to the induction coil 22 can be accurately obtained from the feeding speed of the wire rod W detected by the speed detecting apparatus 4, thereby facilitating an improvement of the production yield.

(3) The controller 5 may control the current I to be supplied to the induction coil 22 based on another calculation formula expressed by $I=k \times (v^{0.5})+\Delta I$ in which the standby current ΔI is added to the foregoing calculation formula. Therefore, if electromagnetic oscillation of the power supply rises at a speed faster than a feeding speed of the wire rod, rising of the current I becomes faster by an amount of the standby current ΔI, so that a time of the feeding speed v of the wire rod W to reach a specified speed can be shortened. In contrast, if the standby current ΔI is eliminated and the current in the interruption state becomes zero, as shown in FIG. 2, when the controller 5 controls the power supply 21, due to the delay by the oscillation, the current I becomes I'. Thus, the timing to heat the wire rod W is delayed, so that heating of the wire rod W cannot be sufficiently performed.

(4) The first and second coils 221, 222 and the power supply 21 form one heating unit 20 and the third and fourth coils 223, 224 and the power supply 21 form another heating unit 20, and the controller 5 controls respective power supply for each heating unit. Therefore, the heating of the wire rod W can be easily managed, as compared with a case in which four power supplys 21 are connected to the first coil 221, the second coil 222, the third coil 223 and the fourth coil 224, respectively, and the power supplys 21 are separately controlled.

Simulation for confirming the effects of the embodiment will now be described.

[Simulation Conditions]

Figure 3:
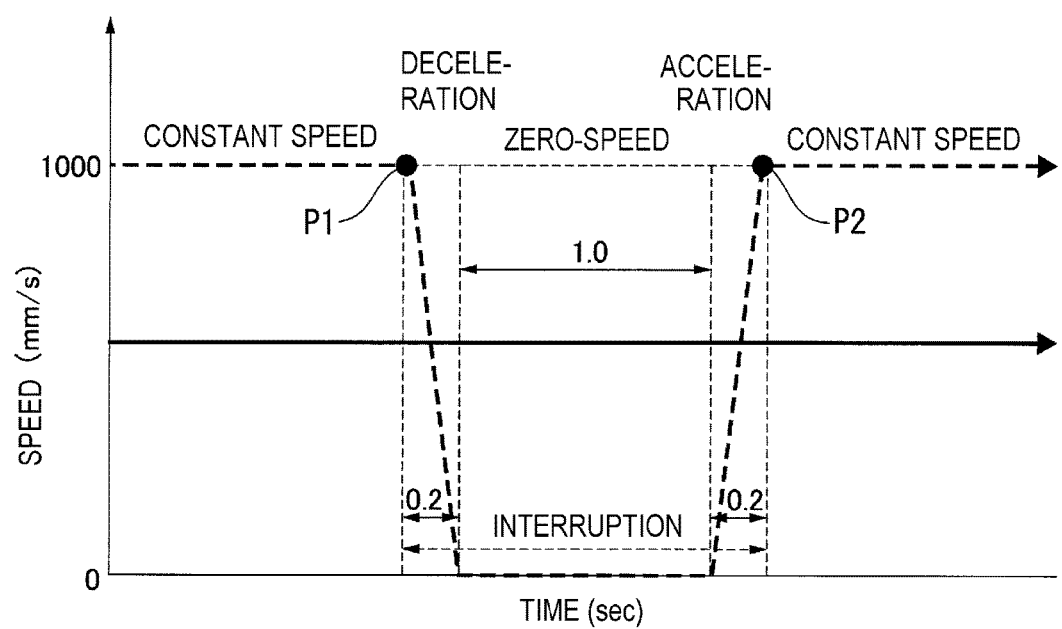
FIG. 3 is a graph showing a relationship between time and the feeding speed of the wire rod according to a simulation.

Diameter φ of wire rod W: 17 mm
Material of wire rod W: Spring steel
First to Fourth coils 221, 222, 223, 224:
  Length L2 of each coil is 400 mm
  30 Turns
Distance L1 between second and third coils 222, 223: 400 mm
Length L3 between first and second coils 221, 222 and between third and fourth coils 223, 224: 200 mm
Length of heating section 2A: L1+4×L2+2×L3=2400 mm
Length of soaking section: 1000 mm
Frequency: 10 kHz
Initial temperature: 20° C.
Heating temperature:
  Outlet of second coil 222: 400° C.
  Outlet of fourth coil 224: 400° C.
  Target temperature at processing machine: 300±20° C.
Feeding speed v of wire rod W:

As shown in FIG. 3, the feeding speed v of the wire rod W in the constant speed mode is 1000 mm/s. In the interruption mode, the feeding speed v decreases from 1000 mm/s to 0 mm/s for 0.2 second during a deceleration state, the feeding speed is maintained at zero for 1.0 second during a stop state, and the feeding speed accelerates from 0 mm/s to 1000 mm/s for 0.2 second during an acceleration state.

Figure 4:
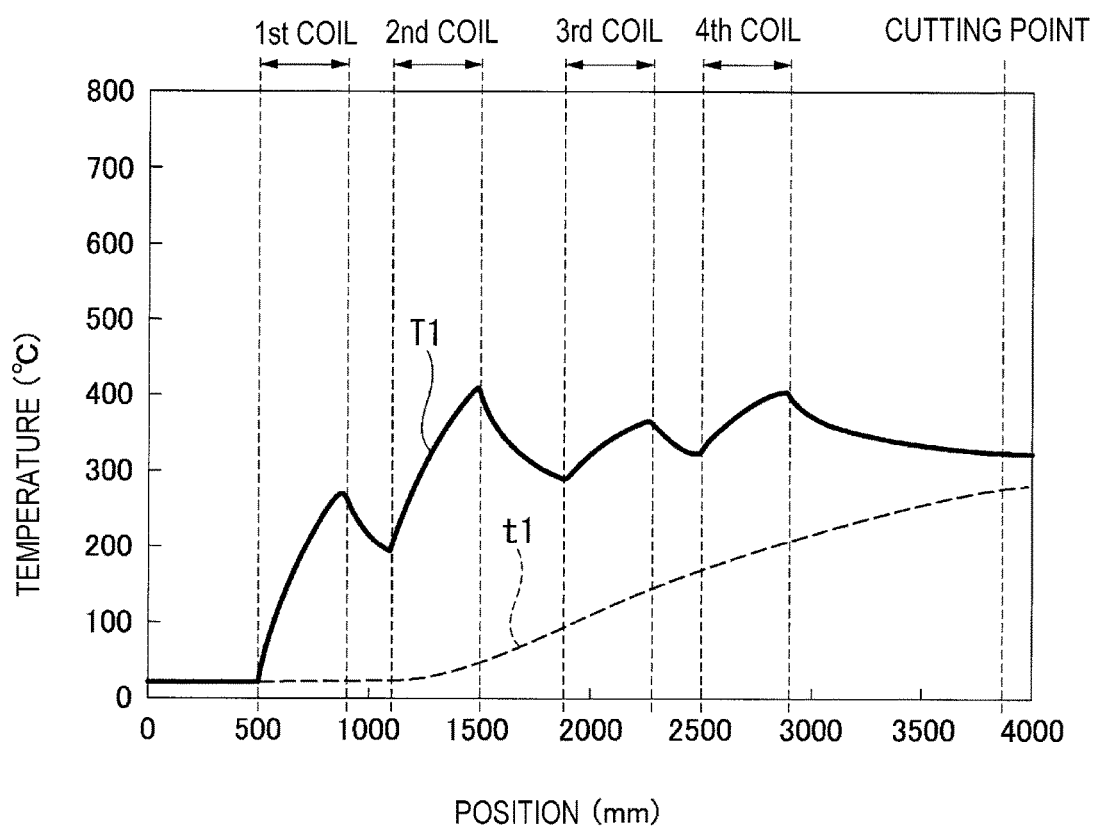
FIG. 4 is a graph showing a temperature distribution of the wire rod in an axial direction thereof after the completion of a constant speed mode.
Figure 5:
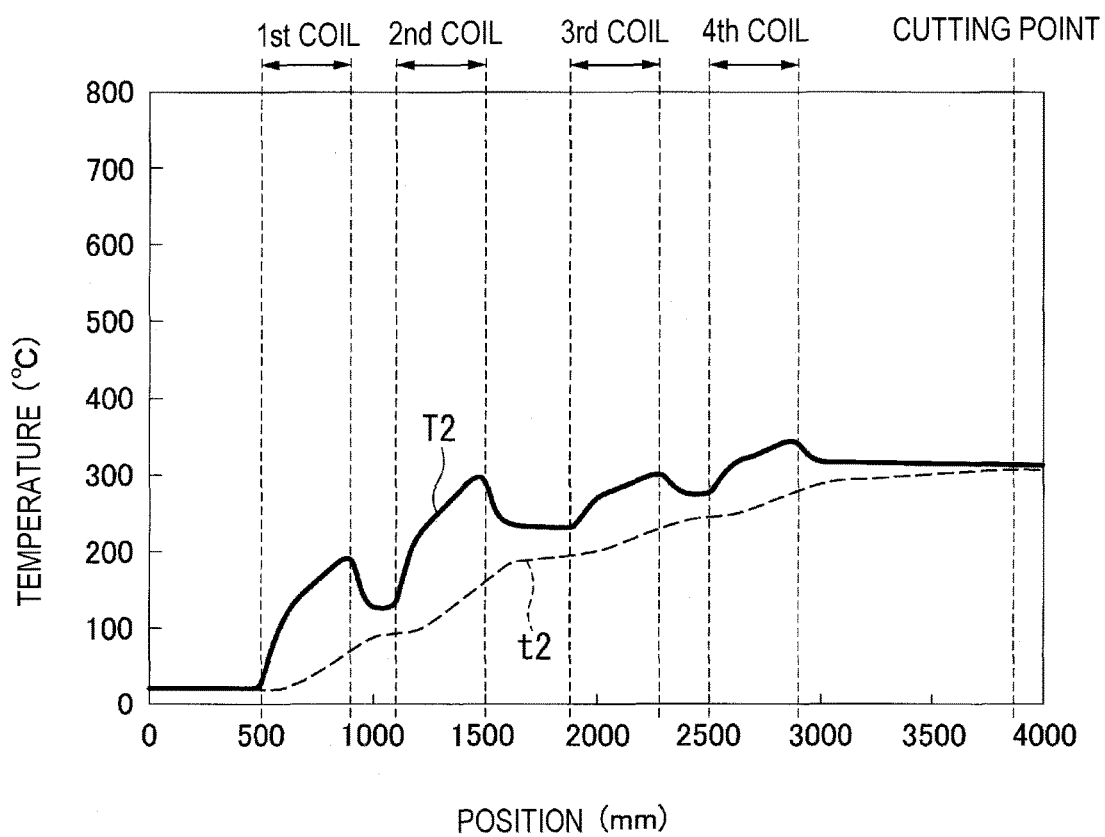
FIG. 5 is a graph showing a temperature distribution of the wire rod after the completion of an interruption mode, wherein the current supplied to the induction coil is controlled according to an embodiment.
Figure 6:
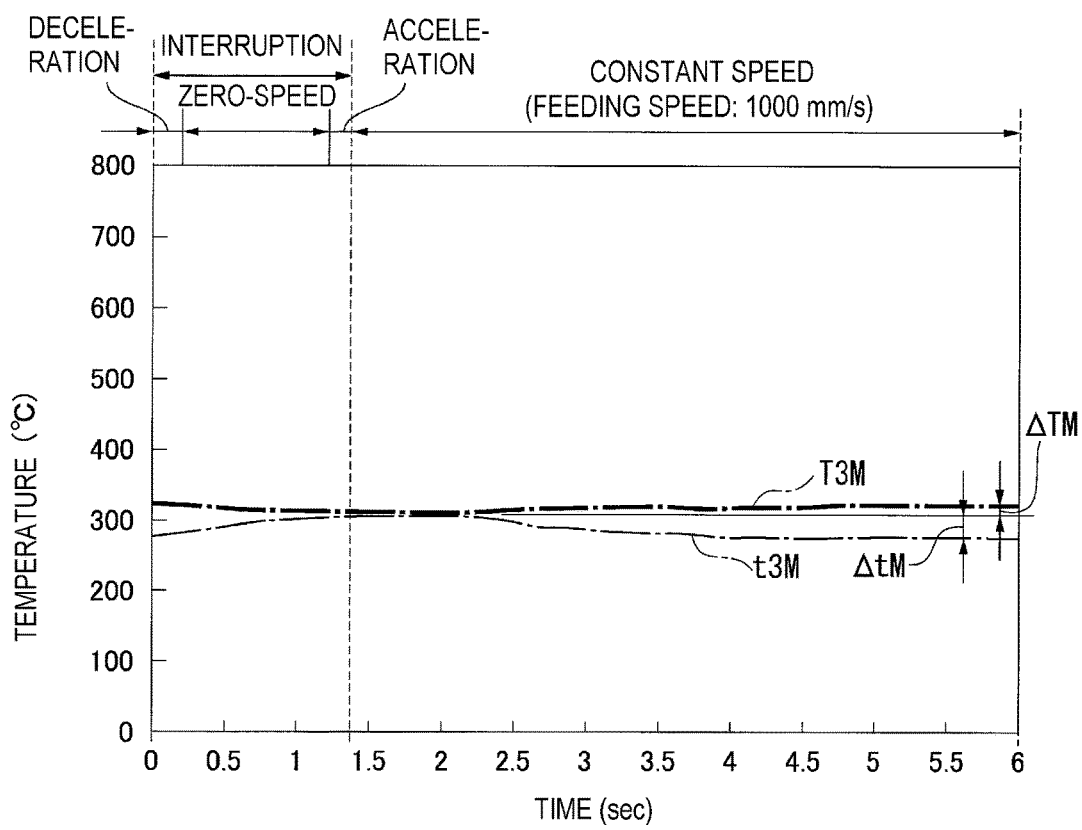
FIG. 6 is a graph showing a history of the temperature of the wire rod with respect to time at a processing position after the completion of the interruption mode, wherein the current supplied to the induction coil is controlled according to the embodiment.

Heating condition: induction coil current control
Analysis method: magnetic field-heat coupled analysis using finite elements method (FEM)
Analysis model: 2D axisymmetric FEM model FIGS. 4 to 6 show graphs for confirming the effects of the present embodiment.

FIG. 4 shows a temperature distribution of the wire rod in an axial direction thereof at the end of the constant speed mode. In FIG. 4, a horizontal axis indicates a position of the wire rod W on a processing line to which the wire rod is fed, 0 is a position of the wire feeding apparatus 1, 500 is a position of the upstream end of the first coil 221, and 3900 is a position at which the wire rod W is cut and is located at the downstream end of the soaking section 2B. The temperature range shown in FIG. 4 is the range at a point P1 at which the constant speed mode is switched to the deceleration mode in FIG. 3.

As shown in FIG. 4, although the surface temperature T1 has an initial temperature of 20° C. up to the vicinity of the inlet of the first coil 221, the temperature shows 270° C. near the outlet of the first coil 221. Further, the surface temperature T1 slightly decreases from the vicinity of the outlet of the first coil 221 to the vicinity of the inlet of the second coil 222, and in turn increases to about 400° C. at the outlet of the second coil 222. The surface temperature T1 decreases and increases at the vicinities of the inlet and the outlet, respectively, of the third coil 223, and also decreases and increases to about 400° C. at the vicinities of the inlet and the outlet, respectively, of the fourth coil 224. In the soaking section 2B starting from the outlet of the fourth coil 224, the surface temperature T1 slightly decreases, and at the cutting position, the surface temperature T1 reaches the target temperature, i.e. 324° C. The core temperature t1 of the wire rod W passing through the first coil 221 does not vary and maintains at an initial temperature of 20° C. up to the vicinity of the inlet of the second coil 222, and continuously increases from a position of the second coil 222 through positions of the third and fourth coils 223, 224 and the soaking section 2B and reaches 278° C. at the cutting position. At the cutting position, a temperature difference between the surface temperature T1 and the core temperature t1 is 46° C.

FIG. 5 is a graph showing a temperature distribution of the wire rod at the end of the interruption mode, wherein the current supplied to the induction coil is controlled according to the present embodiment. In FIG. 5, a horizontal axis indicates a position as in the horizontal axis of FIG. 4. The temperature range shown in FIG. 5 is the range at a point P2 at which the acceleration mode is switched to the constant speed mode in FIG. 3.

As shown in FIG. 5, the surface temperature T2 maintains an initial temperature of 20° C. up to the vicinity of the inlet of the first coil 221 and in turn increases to about 190° C. at the vicinity of the outlet of the first coil 221. The surface temperature T2 sharply decreases from the vicinity of the outlet of the first coil 221 to the vicinity of the inlet of the second coil 222, increases to about 300° C. at the vicinity of the outlet of the second coil 222, decreases at the vicinity of the inlet of the third coil 223 and increases to about 300° C. again at the vicinity of the outlet of the third coil, and decreases at the vicinity of the inlet of the fourth coil 224 and then increases to about 340° C. at the vicinity of the outlet of the fourth coil. The surface temperature T2 slowly decreases from the outlet of the fourth coil 224 and reaches about 300° C. at the cutting position.

The core temperature t2 of the wire rod W increases from an initial temperature of 20° C. to about 80° C. at the first coil 221, increases to about 160° C. at the outlet of the second coil 222, increases to the about 220° C. at the outlet of the third coil 223, increases to about 280° C. at the outlet of the fourth coil 224, and increases to about 300° C. at the cutting position.

That is, at the downstream end of the soaking section 2B, the surface temperature and the core temperature of the wire rod W become equal.

FIG. 6 is a graph showing a history of the temperature of the wire rod with respect to time at a processing position at the end of the interruption mode, wherein the current supplied to the induction coil is controlled according to the present embodiment.

In FIG. 6, a position at a time of 0 (second) is a start point at which the constant speed mode is switched to the deceleration mode. The deceleration mode is continued for 0.2 second from the start point (0 second) to 0.2 second, the zero-speed mode is continued for 1.0 second from the 02 second to 1.2 seconds, and the acceleration mode is continued for 0.02 second from 1.2 seconds to 1.4 seconds. That is, the interruption mode is continued from the start point (0 second) to 1.4 seconds, and the interruption mode switches to the constant speed mode after 1.4 seconds from the start point.

In FIG. 6, the surface temperature T3M of the wire rod at the cutting position decreases from 320° C. to 310° C. during a period from the start to end of the interruption mode (i.e. for 1.4 seconds from the start point), and when 1.1 second passed after the interruption mode switches to the constant speed mode (i.e. when 2.5 seconds passed from the start point), increases to and maintains about 320° C.

The core temperature t3M of the wire rod at the cutting position increases from about 280° C. to about 310° C. during a period from the start to end of the interruption mode, and when 1.0 second passed after the interruption mode is switched to the constant speed mode (i.e. when 2.4 seconds passed from the start point), maintains 280° C.

Figure 7:
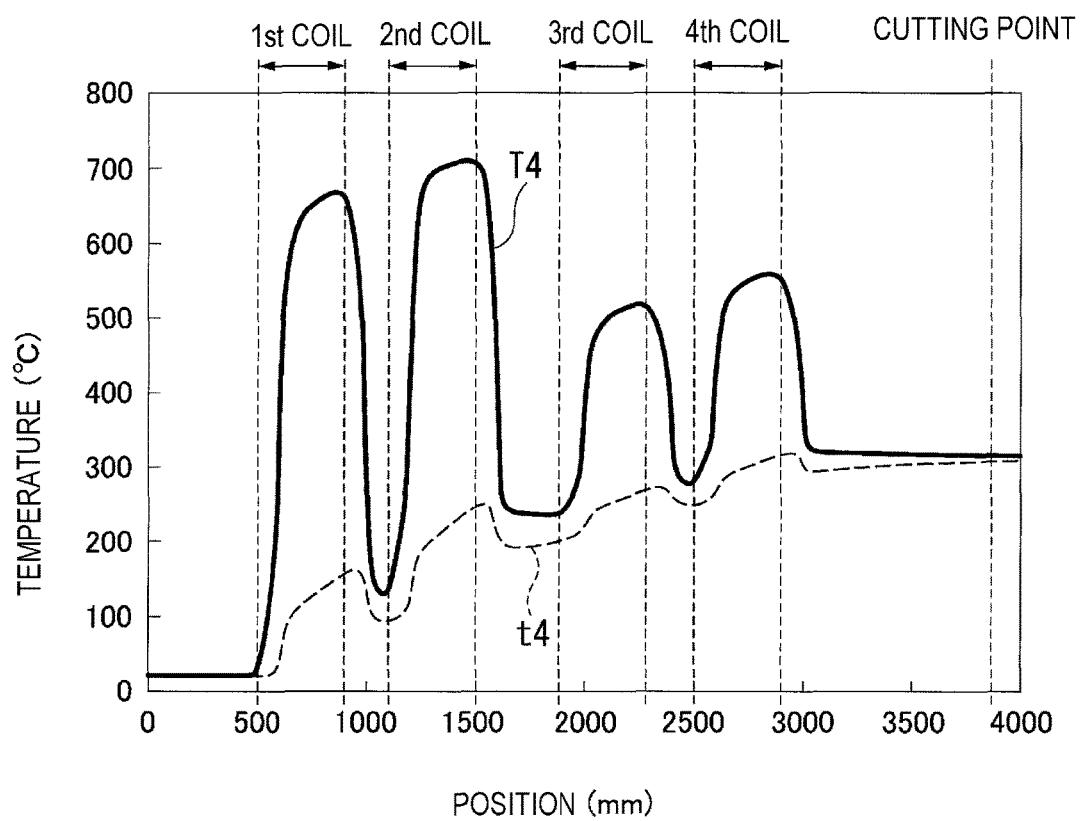
FIG. 7 is a graph showing a temperature distribution of the wire rod in an axial direction thereof after the completion of an interruption mode, wherein in the interruption mode, the wire rod is heated as in the constant speed mode.

Next, a case in which the wire rod is heated in the interruption mode in a similar manner as in the constant speed mode will be described with reference to FIGS. 7 and 8. FIG. 7 is a graph showing a temperature distribution of the wire rod in an axial direction thereof at the end of the interruption mode, wherein in the interruption mode, the wire rod is heated as in the constant speed mode. In FIG. 7, a horizontal axis indicates a position as in the horizontal axis of FIG. 4. The temperature range shown in FIG. 7 is the range at a point P2 at which the acceleration mode is switched to the constant speed mode in FIG. 3.

As shown in FIG. 7, the surface temperature T4 maintains an initial temperature of 20° C. up to the vicinity of the inlet of the first coil 221 and in turn increases to about 650° C. at the vicinity of the outlet of the first coil 221. The surface temperature T4 sharply decreases from the vicinity of the outlet of the first coil 221 to the vicinity of the inlet of the second coil 222, and then increases to about 700° C. or more at the vicinity of the outlet of the second coil 222. The surface temperature T4 decreases at the vicinity of the inlet of the third coil 223 and increases to about 500° C. at the vicinity of the outlet of the third coil, and decreases at the vicinity of the inlet of the fourth coil 224 and then increases to about 550° C. at the vicinity of the outlet of the fourth coil. In the soaking section 2B starting from the outlet of the fourth coil 224, the surface temperature T4 slowly decreases and reaches about 310° C. at the cutting position. The core temperature t4 of the wire rod W passing through the first coil 221 increases from an initial temperature of 20° C. to about 160° C. at the first coil 221, decreases at the vicinity of the inlet of the second coil 222 and increases to about 250° C. at the outlet of the second coil 222, decreases at the vicinity of the inlet of the third coil 223 and increases to the about 270° C. at the outlet of the third coil 223, decreases at the vicinity of the inlet of the fourth coil 224 and increases to about 310° C. at the outlet of the fourth coil, slightly decreases from the outlet to the downstream side therefrom, and increases at the soaking section 2B and reaches about 310° C. at the cutting position.

Figure 8:
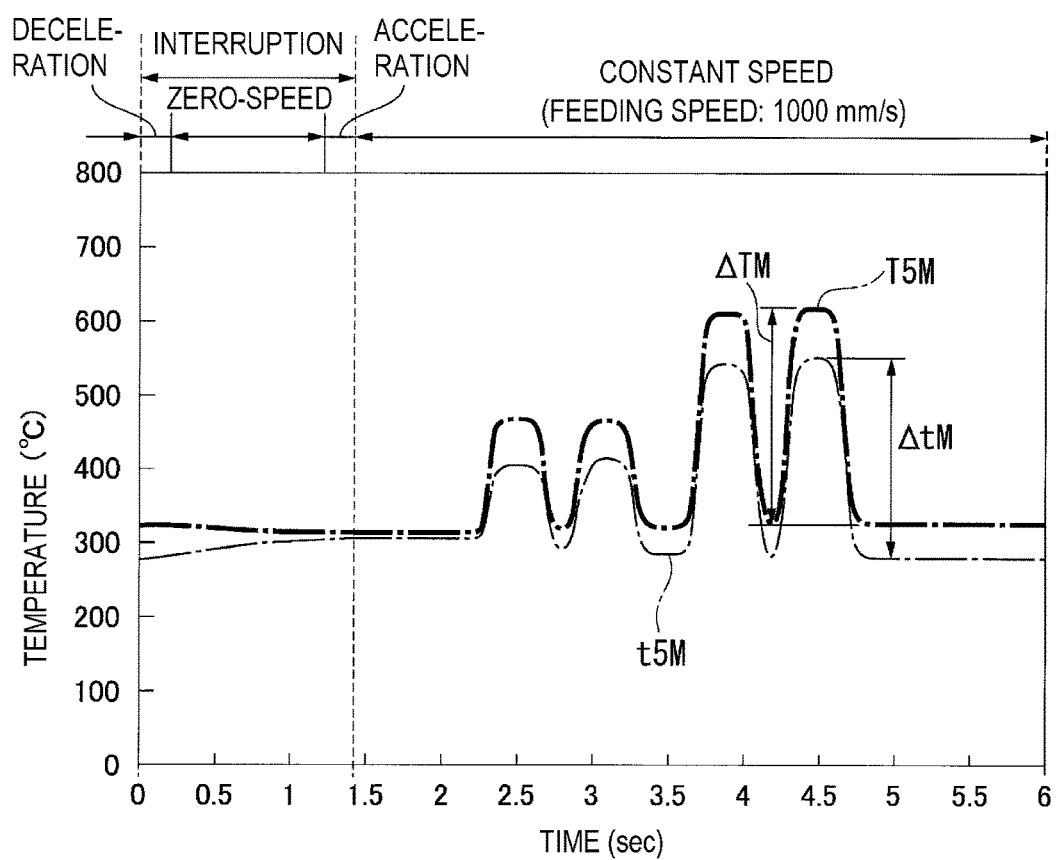
FIG. 8 is a graph showing a history of the temperature of the wire rod with respect to time at a processing position after the completion of the interruption mode, wherein in the interruption mode, the wire rod is heated as in the constant speed mode.

FIG. 8 is a graph showing a history of the temperature of the wire rod with respect to time at a processing position at the end of the interruption mode, wherein in the interruption mode, the wire rod is heated as in the constant speed mode.

The surface temperature T5M of the wire rod at the cutting position at the downstream end of the soaking section 2B increases from 320° C. at the start point to about 480° C. when 0.9 second passed after the interruption mode is switched to the constant speed mode (i.e. when 2.3 seconds passed from the start point) and then decreases to about 320° C., and repeatedly increases and decreases in the same manner as in the first cycle. Further, when 2.4 seconds passed after the interruption mode is switched to the constant speed mode (i.e. when 3.8 seconds passed from the start point), the surface temperature T5M increases to about 610° C., decreases to about 320° C., and increases to 620° C. again, and when 3.3 seconds passed after the interruption mode is switched to the constant speed mode (i.e. when 4.7 seconds passed from the start point), the surface temperature maintains a constant temperature of about 320° C.

The core temperature t5M of the wire rod at the cutting position increases from 280° C. to about 480° C. when 0.9 second passed after the interruption mode is switched to the constant speed mode and then decreases to about 300° C. Further, when 2.4 seconds passed after the interruption mode is switched to the constant speed mode (i.e. when 3.8 seconds passed from the start point), the core temperature t5M increases to about 560° C. and then decreases to about 280° C., and repeatedly increases and decreases in the same manner as in the former cycle. Further, when 3.4 seconds passed after the interruption mode is switched to the constant speed mode (i.e. when 4.8 seconds passed from the start point), the core temperature t5M maintains a constant temperature of about 280° C.

As such, a difference ΔTM in surface temperature T5M at the cutting position is 300° C., and a difference ΔtM in core temperature t5M at the cutting position is 280° C. That is, at the interruption mode, when the wire rod W is heated, at the downstream end (i.e. the cutting position) of the soaking section 2B which requires a constant temperature, differences ΔTM and ΔtM in surface temperature and core temperature become 300° C. and 280° C., respectively, which however are high. If the wire rod W is processed in this state, a quality of a product becomes degraded.

Further, a case in which the wire rod is not heated in the interruption mode will be described with reference to FIGS. 9 and 10.

Figure 9:
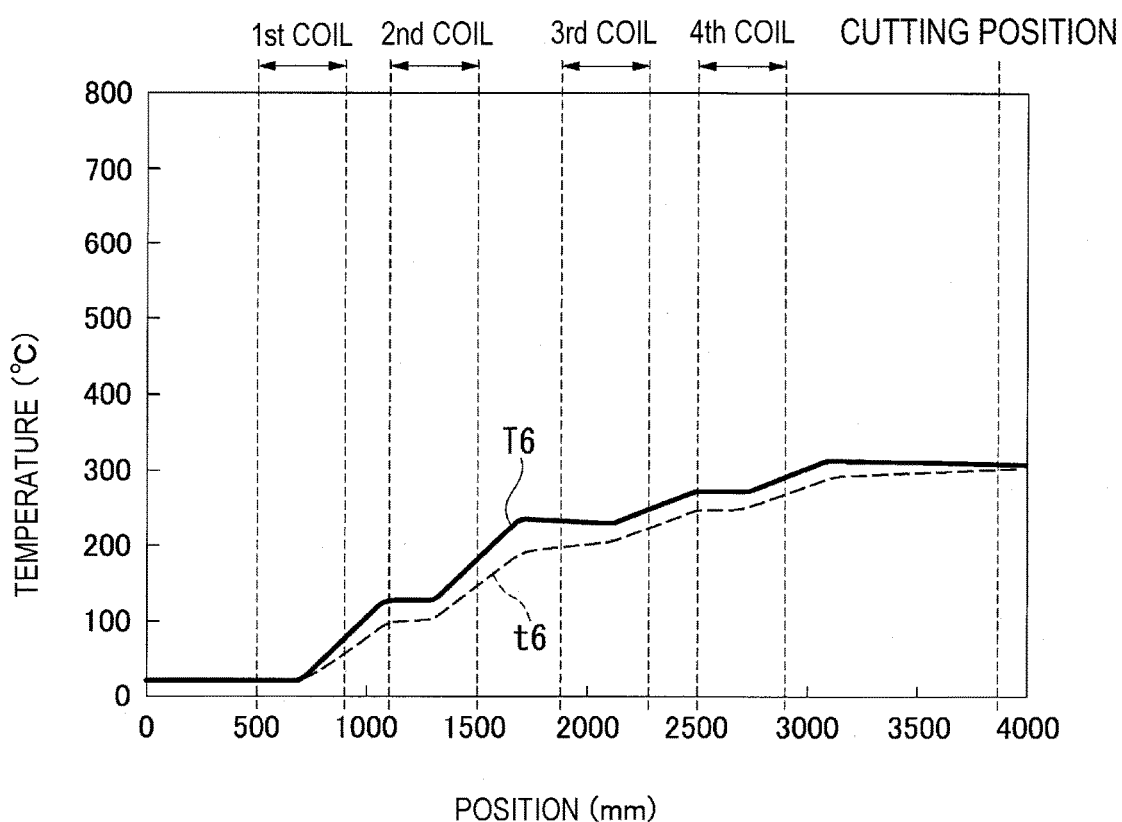
FIG. 9 is a graph showing a temperature distribution of the wire rod in an axial direction thereof after the completion of the interruption mode, wherein in the interruption mode, heating is not carried out.

FIG. 9 is a graph showing a temperature distribution of the wire rod in an axial direction thereof at the end of the interruption mode, wherein in the interruption mode, heating is not carried out. In FIG. 9, a horizontal axis indicates a position as in the horizontal axis of FIG. 4. The temperature range shown in FIG. 9 is the range at a point P2 at which the acceleration mode is switched to the constant speed mode in FIG. 3.

As shown in FIG. 9, the surface temperature T6 maintains an initial temperature of 20° C. up to an intermediate part of the first coil 221, increases to about 140° C. at an intermediate part of the second coil 222, increases to about 220° C. at an intermediate position between the second and third coils 222, 223, increases to about 280° C. at an intermediate part of the fourth coil 224, and increases to 320° C. at an intermediate part of the soaking section 2B and maintains the temperature up to the cutting position. The core temperature t6 of the wire rod W increases from an initial temperature of 20° C. to about 100° C. at the inlet of the second coil 222, increases to about 200° C. at an intermediate position between the second and third coils 222, 223, increases to the about 280° C. at the outlet of the fourth coil 224, and increases to about 320° C. at the cutting position.

Figure 10:
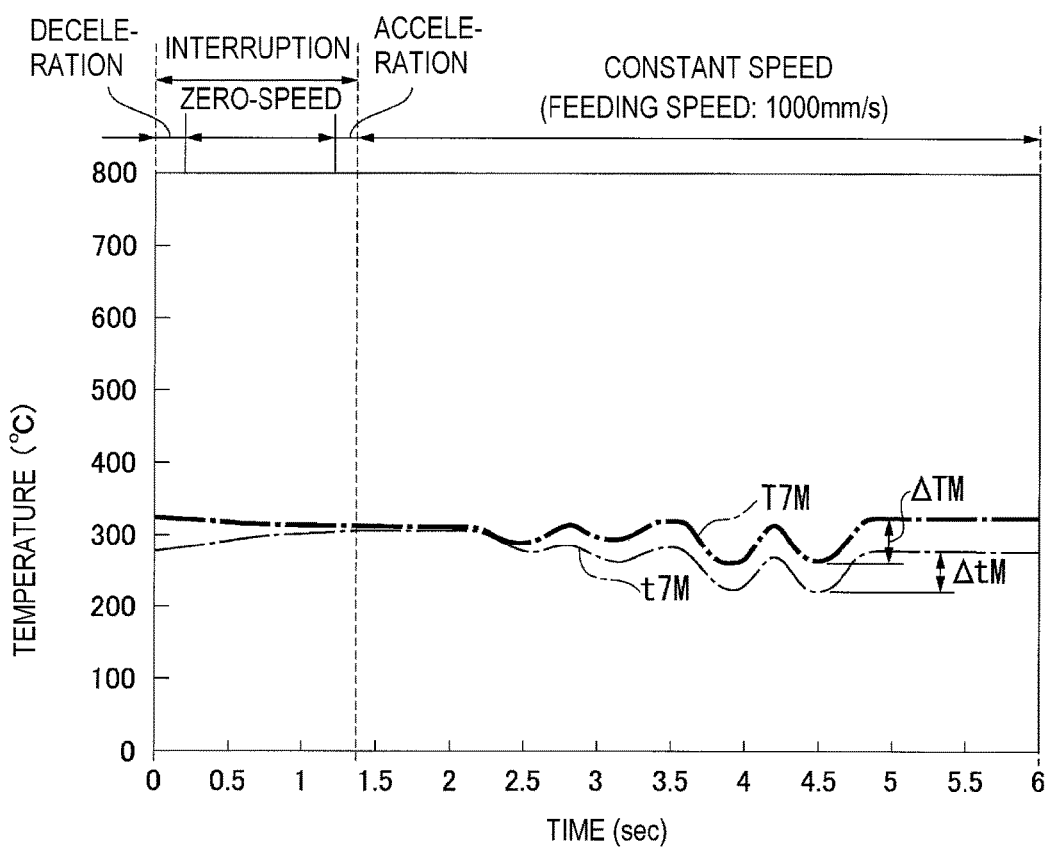
FIG. 10 is a graph showing a history of the temperature of the wire rod with respect to time at a processing position after the completion of the interruption mode, wherein in the interruption mode, heating is not carried out.

FIG. 10 is a graph showing a history of the temperature of the wire rod with respect to time at a processing position at the end of the interruption mode, wherein in the interruption mode, heating is not carried out.

In FIG. 10, the surface temperature T7M of the wire rod at the cutting position decreases from 330° C. to 320° C. during a period from the start to end of the interruption mode (for 1.4 seconds from the start point), and decreases to about 290° C. when 0.8 second passed after the interruption mode is switched to the constant speed mode (i.e. when 2.2 seconds passed from the start point), and then increases to about 310° C. The surface temperature T7M repeatedly decreases and increases, and when 2.4 seconds passed after the interruption mode is switched to the constant speed mode (i.e. when 4.8 seconds passed from the start point), the surface temperature T7M maintains a constant temperature of about 330° C.

The core temperature t7M of the wire rod at the cutting position increases from about 280° C. to about 310° C. during a period from the start to end of the interruption mode and repeatedly increases and decreases, and when 3.1 seconds passed after the interruption mode switches to the constant speed mode (i.e. when 4.5 seconds passed from the start point), decreases to about 220° C., and when 3.4 seconds passed after the interruption mode is switched to the constant speed mode (i.e. when 4.8 seconds passed from the start point), maintains a constant temperature of about 280° C.

As such, a difference $\Delta TM$ in surface temperature T7M at the cutting position is 30° C., and a difference $\Delta tM$ in core temperature t7M at the cutting position is 60° C. That is, at the interruption mode, when the wire rod W is not heated, at the downstream end (i.e. the cutting position) of the soaking section 2B which requires a constant temperature, differences $\Delta TM$ and $\Delta tM$ in surface temperature and core temperature are generated. If the wire rod W is processed, is processed a quality of a product becomes degraded.

As set forth in the foregoing, according to the present embodiment, in a case where, at the interruption mode, the wire rod W is heated based on the foregoing calculation formula, differences in surface temperature and core temperature for each position according to elapsed time are small, compared to the case where, as shown in FIG. 8, the wire rod is heated in the interruption mode in the same manner as in the constant speed mode, or the case where, as shown in FIG. 10, the wire rod is not heated at the interruption mode.

That is, according to the present embodiment, a difference $\Delta TM$ in surface temperature T3M of the wire rod W at the cutting position is 10° C., and a difference $\Delta tM$ in core temperature t3M at the cutting position is 30° C.

In the interruption mode, when the wire rod W is not heated based on the foregoing calculation formula, at the downstream end (i.e. the cutting position) of the soaking section 2B which requires a constant temperature, differences $\Delta TM$ and $\Delta tM$ in surface temperature and core temperature have very small values. Accordingly, in this state, when the wire rod W is processed, a product has a homogeneous quality.

The present invention is not limited to the embodiments described above, and may include following modifications.

For example, although the embodiment described above has adapted a calculation formula that adds the standby current $\Delta I$ to a calculation formula for controlling the current I to be supplied to the induction coil 22, in a case of a rapidly-rising type power supply, the present invention may eliminate the standby current $\Delta I$ from the former calculation formula.

Further, although the disclosed embodiment has adapted two heating units 20 in which the first heating unit has the first and second coils 221, 222 and the power supply 21 and the second heating unit has the third and fourth coils 223, 224 and the power supply 21, the current may be supplied to a plurality of coils using a single power supply without forming a unit, and the number of the coils is not limited to four, and may be one, two, three, five or more.

Although the disclosed embodiment has adapted the wire-speed detecting apparatus 4 disposed upstream of the wire feeding apparatus 1, the location of the speed detecting apparatus is not limited to this position, and may be in the middle of or downstream of the induction heating apparatus 2.

Further, to implement the present invention, the wire feeding apparatus 1, the processing machine 3, and the wire-speed detecting apparatus 4 may be omitted. The heating apparatus having the induction heating apparatus 2 and the controller 5 may be combined with other apparatuses. For example, if the changes in the feeding speed of the wire rod W are previously stored in the controller 5, the wire-speed detecting apparatus 4 may be omitted.

The present invention is also applicable in a situation where there is an interruption for a certain period of time or a plurality of interruptions at regular intervals.

This application is based on Japanese Patent Application No. 2013-051926 filed on Mar. 14, 2013, the entire content of which is incorporated herein by reference.

The invention claimed is:

1. A wire heating system comprising:
    an induction heating apparatus comprising a power supply and an induction coil arranged to heat a wire rod by an induction heating using current supplied from the power supply; and
    a controller configured to control the current to be supplied to the induction coil based on a feeding speed of the wire rod,
    wherein the induction heating apparatus has a heating section in which the wire rod is heated by the induction heating using the induction coil, and a soaking section disposed downstream of the heating section to homogenize the temperature distribution of the wire rod induction-heated by the induction coil such that the temperature of the wire rod at a downstream end of the soaking section becomes a target temperature,
    wherein the controller is configured to control the current to be supplied to the induction coil such that the temperature of the wire rod at the downstream end of the soaking section becomes the target temperature,
    wherein the feeding speed has an increasing state and a decreasing state, and
    wherein the controller is configured to control the current to be supplied to the induction coil so as to satisfy $I=k \times v^{0.5}+\Delta I$, wherein I is the current to be supplied to the induction coil, v is the feeding speed of the wire rod, k is a proportional constant, and $\Delta I$ is a standby current.

2. The wire heating system according to claim 1, wherein the target temperature is in a range of 300° C. to 500° C.

3. The wire heating system according to claim 1, further comprising:
    a processing machine arranged to process the wire rod induction-heated by the induction heating apparatus;
    a wire feeding apparatus arranged to intermittently feed the wire rod to the induction heating apparatus; and
    a speed detecting apparatus arranged to detect the feeding speed of the wire rod fed by the wire feeding apparatus and to send a signal indicative of the detected feeding speed of the wire rod to the controller.

4. The wire heating system according to claim 1, wherein the feeding speed has a plurality of modes, the plurality of modes being different from each other.

5. The wire heating system according to claim 4, wherein the feeding speed has a first mode in which the wire rod is fed to the induction coil at a constant speed, a second mode in which the feeding speed is zero, a third mode in which the feeding speed is decreased from the first mode to the second mode, and a fourth mode in which the feeding speed is increased from the second mode to the first mode.

6. The wire heating system according to claim 1, wherein the controller is configured to supply the standby current to the induction coil when the feeding speed is zero, the standby current having a value greater than zero.

7. A wire heating method comprising:
heating a wire rod fed into an induction coil in a heating section by an induction heating;
homogenizing the temperature distribution of the wire rod in a soaking section located downstream of the heating section;
controlling current to be supplied to the induction coil based on a feeding speed of the wire rod fed into the induction coil such that the temperature of the wire rod at a downstream end of the soaking section becomes a target temperature; and
feeding the wire rod at a feeding speed, the feeding speed having an increasing state and a decreasing state,
wherein the controlling of the current comprises controlling the current to be supplied to the induction coil so as to satisfy $I=k \times v^{0.5}+\Delta I$, wherein I is the current to be supplied to the induction coil, v is the feeding speed of the wire rod, k is a proportional constant, and $\Delta I$ is a standby current.

8. The wire heating method according to claim 7, wherein the wire rod is fed to the induction coil at the feeding speed having a plurality of modes, the plurality of modes being different from each other.

9. The wire heating method according to claim 8, wherein the wire rod is fed to the induction coil in a first mode which the feeding speed is constant, in a second mode which the feeding speed is zero, in a third mode which the feeding speed is decreased from the first mode to the second mode, and in a fourth mode which the feeding speed is increased from the second mode to the first mode.

10. The wire heating method according to claim 7, wherein the controlling of the current further comprises supplying the standby current to the induction coil when the feeding speed is zero, the standby current having a value greater than zero.

* * * * *